United States Patent [19]
Strange et al.

[11] 4,385,853
[45] May 31, 1983

[54] ARBOR FOR ROTARY CUTTING TOOL

[75] Inventors: Robert E. Strange, Grosse Pointe Woods; Charles F. Morris, Flint, both of Mich.

[73] Assignee: Jancy Engineering Co., Davenport, Iowa

[21] Appl. No.: 232,865

[22] Filed: Feb. 9, 1981

[51] Int. Cl.³ ............................................. B23B 51/04
[52] U.S. Cl. ...................... 408/68; 408/200; 408/204; 408/209
[58] Field of Search ............... 408/68, 67, 209, 204, 408/201, 203.5, 202, 206, 56, 200; 144/23

[56] References Cited
U.S. PATENT DOCUMENTS

| | | | |
|---|---|---|---|
| 201,285 | 3/1878 | Pentlarge | 408/68 X |
| 1,150,279 | 8/1915 | Little | 408/68 |
| 1,705,049 | 3/1929 | Fournier | 408/68 |
| 2,429,245 | 10/1947 | Telles | 408/68 |
| 2,463,799 | 3/1949 | Palmer | 408/68 |
| 3,104,564 | 9/1963 | Hougen | 408/68 X |
| 3,180,018 | 4/1965 | Hougen | 408/68 X |
| 3,302,526 | 2/1967 | Chendy et al. | 408/112 |
| 3,825,362 | 7/1974 | Hougen | 408/204 X |
| 4,129,401 | 12/1978 | Berthier | 408/204 X |
| 4,204,783 | 5/1980 | Hougen | 408/68 |

*Primary Examiner*—William R. Briggs
*Attorney, Agent, or Firm*—Robert G. Mentag

[57] ABSTRACT

An arbor for a rotary cutting tool which includes an elongated cylindrical shank that has an axial bore formed therethrough. The upper end of the shank is adapted to be attached to the drive spindle of an electric motor. The arbor shaft is slidably mounted in a carrier sleeve which is rotatable with the arbor shank which is retained against axial movement by a mounting means. An annular cutter is attached to the lower end of the arbor shank and a pilot ejector member is slidably mounted therein. The pilot ejector member is retained in the normal at rest position by a spring which has its upper end mounted in a bore in a piston that is attached to the carrier sleeve. The lower end of the spring engages a plunger member which maintains the pilot ejector member in its initial and other operative positions.

5 Claims, 4 Drawing Figures

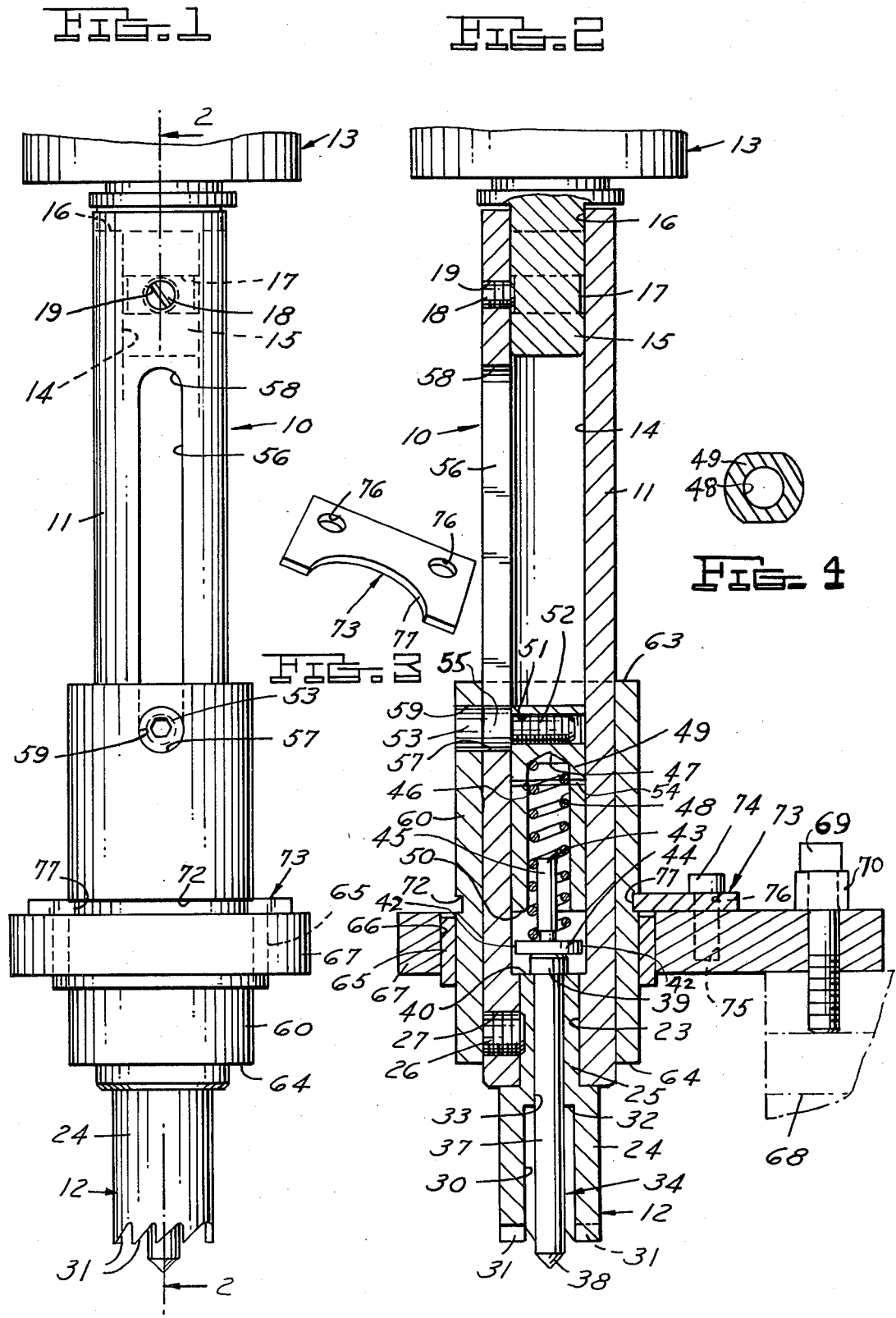

ature, and more particularly to an arbor for such cutters which is provided with a pilot ejecting member for ejecting the circular slug, cut from a workpiece, from within an annular hole cutter after the completion of a hole cutting operating.

ARBOR FOR ROTARY CUTTING TOOL

BACKGROUND OF THE INVENTION

1. Field of the invention

This invention relates to the annular hole cutter art, and more particularly to an arbor for such cutters which is provided with a pilot ejecting member for ejecting the circular slug, cut from a workpiece, from within an annular hole cutter after the completion of a hole cutting operating.

2. Description of the Prior Art

It is well known in the annular hole cutter art to employ arbors which include slug ejector means. A disadvantage of such prior art arbors is that they are complex and expensive to make, and time consuming to mount in place for use of the same. An example of such prior art arbors is shown in U.S. Pat. No. 3,825,362 wherein the ejector member driving means includes a cross pin engaged by a spring in a line contact that results in wobbling pressure on the ejector member. Further examples of such prior art arbors are illustrated in U.S. Pat. Nos. 58,924; 201,285; 237,242; 1,150,279; 1,705,049; 3,302,526; 2,429,245; 2,433,058, 2,923,180 and 3,180,018.

SUMMARY OF THE INVENTION

In accordance with the present invention, the arbor comprises an elongated cylindrical shank having a rear end constructed for attachment to the drive spindle of a drive motor, and having a bore formed axially therethrough. A support bracket is included with means for fixedly securing the bracket to a mounting member. A carrier sleeve guide bushing is rotatably mounted in said support bracket and it slidably receives and supports said shank for axial sliding movements therethrough. A retainer means is carried on said support bracket and it engages said carrier sleeve guide bushing to hold it in place axially while allowing it to rotate. A piston having a rear end and a front end is slidably mounted in the bore in said shank, toward the front end of the shank, and it has an axial bore extending axially inward from the front end of the piston. A means releasably secures said piston to said carrier sleeve guide bushing. An annular hole cutting tool is releasably secured in the front end of said shank, and it has an axial bore formed therethrough, and it communicates with the bore in said shank. A pilot member is slidably mounted in the axial bore in said cutting tool and it has a rear end and a front end. A plunger means is movably mounted in the bore in said arbor shank and it has one end thereof in abutting engagement with the rear end of said pilot member. A spring means is mounted in the axial bore in the piston and it engages the plunger means for biasing the pilot member front end to a position projecting outwardly of the cutting tool. A means is provided for limiting the axial movement of said shank relative to said carrier sleeve guide bushing during a hole cutting operation.

The plunger means includes a cylindrical shaft, and an integral head, for engagement with the pilot member, on one end thereof, and for engagement with the spring means on the other end thereof.

The means for securing said piston to said carrier sleeve guide bushing includes a transverse screw member.

The means for limiting the axial movement of said shank relative to said carrier sleeve guide bushing includes a longitudinal slot in said shank through which is slidably mounted said transverse screw member.

The shank includes a coolant reservoir for feeding coolant to the cutting tool.

BRIEF DESCRIPTION OF THE DRAWINGS

FIG. 1 is a side elevation view of an arbor for an annular hole cutter made in accordance with the principles of the present invention.

FIG. 2 is a longitudinal section view of the arbor structure illustrated in FIG. 1, taken along the line 2—2 thereof, and looking in the direction of the arrows.

FIG. 3 is a perspective view of a retainer plate employed in the invention.

FIG. 4 is a cross section view of a piston employed in the arbor illustrated in FIGS. 1 and 2.

DESCRIPTION OF THE PREFERRED EMBODIMENTS

Referring now to the drawings, and in particular to FIGS. 1 and 2, the numeral 10 generally designates an arbor for an annular hole cutter made in accordance with the principles of the present invention. The arbor 10 includes an elongated cylindrical shank or shaft 11 which has operatively mounted on the lower end thereof an annular cutter generally indicated by the numeral 12. The upper end of the shank 11 is operatively attached to the drive spindle or shaft 15 of a suitable electrical motor generally indicated by the numeral 13. The electric motor spindle 15 is slidably mounted in the upper end of an axial bore 14 which is formed in the shank 11 from the upper end thereof. The numeral 16 designates a cross slot which is formed through the upper end of the shank 11. The electric motor spindle 15 is provided with a recessed annular groove 17 around the outer periphery thereof which is adapted to receive the inner end of a set screw 18 which is operatively mounted in a threaded hole 19 that is formed through the ball of the arbor shank 11. It will be understood that the inner end of the set screw 18 abuts the surface of the groove 17 for securing the arbor 10 on the electric motor drive spindle 15.

As shown in FIG. 2, a reduced diameter bore 23 is formed inwardly from the lower end of the arbor shank 11 and it extends inwardly and communicates with the lower end of the larger axial bore 14. Slidably mounted in the lower axial reduced bore 23 is the cylindrical shank 25 of the annular cutter 12. The lower end of the shank is integrally attached to the cutter body 24 of the annular cutter 12. The annular cutter shank 25 is releasably secured in the shank bore 23 by a suitable set screw 26 which is threadably mounted through a transverse threaded hole 27 formed through the wall of the lower end of the arbor shank 11.

As shown in FIG. 2, an axial bore 30 is formed in the annular cutter body 24 from the lower end thereof and it extends upwardly to a point indicated by the numeral 32. A plurality of cutter teeth 31 are formed on the lower end of the cutter body 24 in equally spaced apart positions as shown in FIGS. 1 and 2. A reduced diameter axial bore 33 is formed through the cutter shank 25 and it communicates the bore 30 in the cutter body 24 with the enlarged bore 14 in the arbor shank 11.

The numeral 34 in FIG. 2 generally designates a pilot ejector member which has an elongated cylindrical body 37 that is slidably mounted through the bore 33 and the cutter shank 25. The lower end of the pilot ejector member body 37 has formed thereon a pointed end 38. The numeral 39 in FIG. 2 generally designates an enlarged diameter circular head which is integrally formed on the upper end of the pilot ejector member body 37 and which is adapted to be seated against the upper end 40 of the cutter shank 25 when the tool is in the inoperative position shown in FIG. 2.

The numeral 43 in FIG. 2 generally designates a plunger member which comprises a cylindrical elongated body 45 and an integral circular head 44 formed on the lower end thereof. The plunger head 44 has two flat portions 42 formed on opposite sides thereof to allow passage of oil thereby. A spring 46 has the lower end thereof mounted around the plunger body 45. The spring is operatively mounted in an axial bore 48 that is formed inwardly from the lower end of a piston 49. The spring 46 has its upper end in abutting seating relationship on the upper end of the bore end wall indicated by the numeral 47. The spring 46 functions to normally maintain the plunger head 44 against the head 39 of the pilot ejector member 34. The numeral 50 designates the lower end of the piston 49. A roll pin 54 is operatively mounted through the upper end of the piston 49 and retains the spring 46 in the piston bore 48.

The piston 49 is fixedly secured to a rotatable carrier sleeve 60 by a suitable retainer screw 52 which is transversely disposed and operatively mounted in a transverse threaded bore 51 formed through the upper end of the piston 49. The retainer screw 52 has its head 53 mounted in a transverse bore 49 formed through the wall of the carrier sleeve 60. A spacer member 55 is mounted around the body of the screw 52 and it is disposed between the screw head 53 and the outer periphery of the piston 49. The spacer member 55 is an annular washer type spacer which is slidably mounted in an elongated longitudinal slot 56 formed through the wall of the arbor shank 11. The numeral 56 designates the lower end of the slot 56. The numeral 58 designates the upper end of the slot 56.

As shown in FIG. 2, the numeral 63 designates the upper end of the carrier sleeve 60 and the numeral 64 designates the lower end of the carrier sleeve 60. The carrier sleeve 60 is rotatably mounted in a suitable annular bearing member 65 which is operatively mounted in a bore 66 in a support bracket 67. The support bracket 67 is fixedly secured to a mounting member 68 on a magnetic drill machine or the like, by a suitable spacer 70 and machine screw 69.

The carrier sleeve 60 is retained against axial movement by a retainer plate generally indicated by the numeral 73. The retainer plate 73 is fixedly secured to the support bracket 67 by suitable machine screws 74 which are threadably mounted in a suitable threaded bore 75 in the support bracket 67. The inner end of the retainer plate 73 is formed with an arcuate recess 77. The inner end of the retainer plate 73 is seated in an annular groove 72 formed around the outer periphery of the carrier sleeve 60 with the arcuate surface 77 on the plate 73 seated against the inner surface of the groove 72. The mounting screws 74 extend through suitable hole 76 formed through the retainer plate 73 and thence into the threaded hole 75 in the support bracket 67.

The portion of the axial bore 14 in the arbor shank 11 above the piston 49 forms an oil reservoir. The portion of the axial bore 14 below the piston 49 and the bore 48 in the piston 49 is also filled with oil for lubricating the mating surfaces between the piston 49 and the arbor shank 11 in a drilling operation.

In use, the arbor with the annular cutter 12 would be disposed in a postion over a workpiece such as one inch metal plate into which it is desired to drill a circular hole. The electric motor 13 and the shank 11 is then moved downwardly through the carrier sleeve 60 while the arbor shank 11 and the carrier sleeve 60 are rotated. The downward movement of the arbor shank 11 is limited by the length of the slot 56. At the downward end of the working movement by the arbor shank 11, the upper end 58 of the slot 56 will engage the spacer member 55. The pilot ejector member 34 functions in the usual manner to eject a slug rolled out of a workpiece during a drilling operation. The spring 46 functions to insure positive ejection of the slug from the cutter body 24. The plunger head 44 provides a full 360° support for the lower end of the spring 46 which provides a positive axial pressure on the pilot ejector member 34 without any lateral binding of thrust. The oil reservoir in the arbor provides internal coolant which functions in a more efficient manner than if coolant were applied externally to the cutting teeth 31. The oil is manually put inside of the bore 14 when it is needed. The requirement for loading oil into the bore 14 is determined in accordance with the thickness of the workpiece being worked on. As for example, for one inch plate workpieces, the oil in the reservoir must be renewed about every four operations.

While it will be apparent that the preferred embodiment of the invention herein disclosed is well calculated to achieve the results aforestated, it will be appreciated that the invention is susceptible to modification, variation and change.

What is claimed is:

1. An arbor for a rotary cutting tool comprising:
   (a) an elongated cylindrical shank having a rear end constructed for attachment to the drive spindle of a drive motor, and having a bore formed axially therethrough-
   (b) a support bracket with means for fixedly securing the bracket to a mounting member;
   (c) a carrier sleeve guide bushing rotatably mounted in said support bracket and slidably receiving and supporting said shank for axial sliding movements therethrough;
   (d) retainer means carried on said support bracket and engaging said carrier sleeve guide bushing to hold it in place axially while allowing it to rotate;
   (e) a piston having a rear end and a front end, slidably mounted in the bore in said shank, toward the front end of the shank, and having an axial bore extending axially inward from the front of the piston;
   (f) means releasably securing said piston to said carrier sleeve guide bushing;
   (g) an annular hole cutting tool releasably secured in the front end of said shank, and having an axial bore formed therethrough and communicating with the bore in said shank;
   (h) a pilot member slidably mounted in the axial bore in said cutting tool and having a rear end and a front end;
   (i) a plunger means movably mounted in the bore in said arbor shank and having one end thereof in abutting engagement with the rear end of said pilot member;
   (j) spring means mounted in the axial bore in the piston and engaging the plunger means for biasing the pilot member front end to a position projecting outwardly of the cutting tool; and, (k) means for limiting the axial movement of said shank relative to said carrier sleeve guide bushing during a hole cutting operation.

2. An arbor for a rotary cutting tool as defined in claim 1, wherein, said plunger means includes a cylindrical shaft and an integral head for engagement with the pilot member on one end thereof, and for engagement with the spring means on the other end thereof.

3. An arbor for a rotary cutting tool as defined in claim 2, wherein, said means for securing said piston to said carrier sleeve guide bushing includes a transverse screw member.

4. An arbor for a rotary cutting tool as defined in claim 3, wherein, said means for limiting the axial movement of said shank relative to said carrier sleeve guide bushing includes a longitudinal slot in said shank through which is slidably mounted said transverse screw member.

5. An arbor for a rotary cutting tool as defined in claim 4, wherein, said shank includes a coolant reservoir for feeding coolant to the cutting tool.

* * * * *